May 14, 1957
Z. J. WILSON
2,791,955
CULTIVATOR
Filed June 6, 1955
2 Sheets-Sheet 1
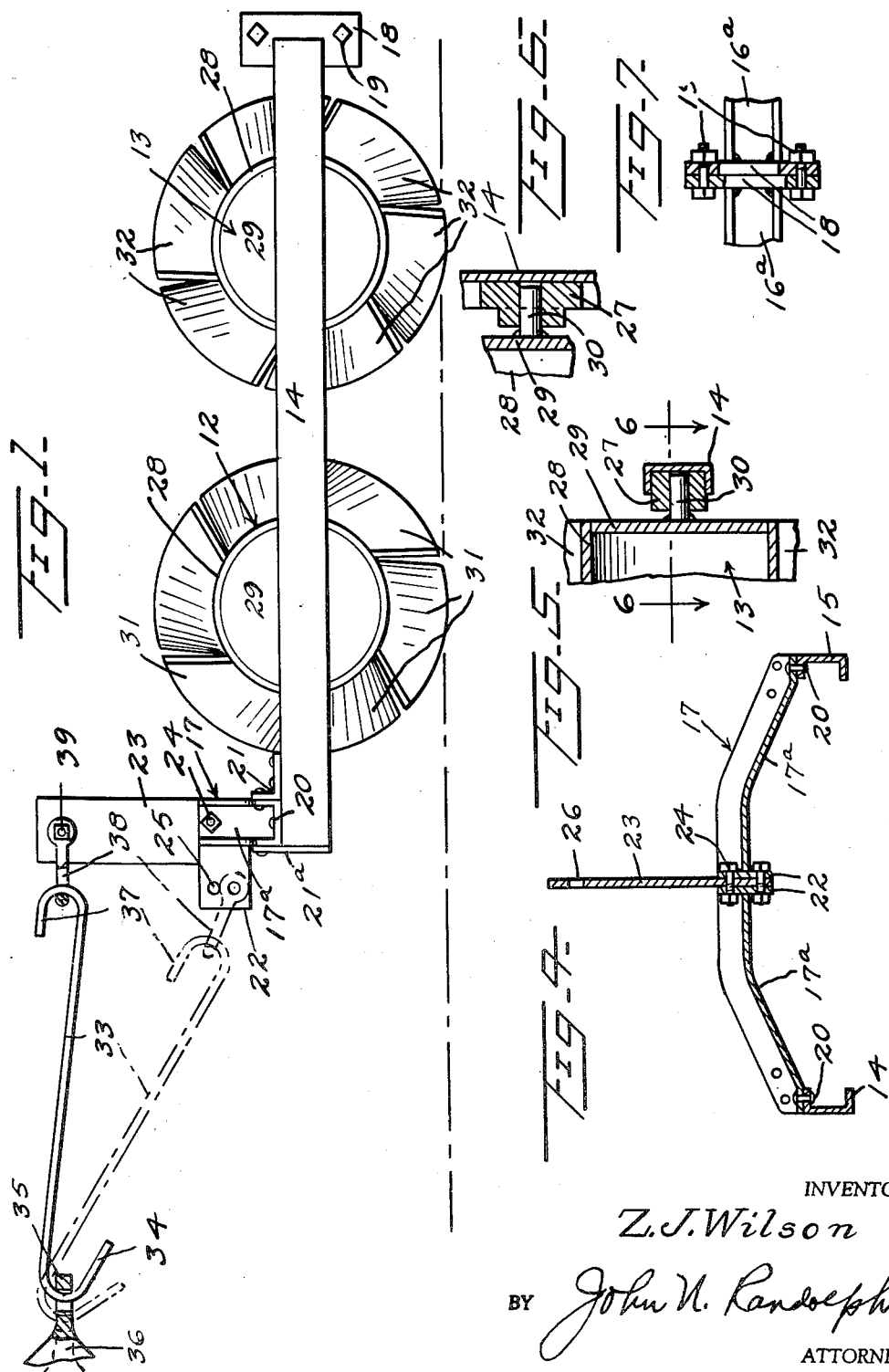
INVENTOR
Z. J. Wilson
BY John N. Randolph
ATTORNEY

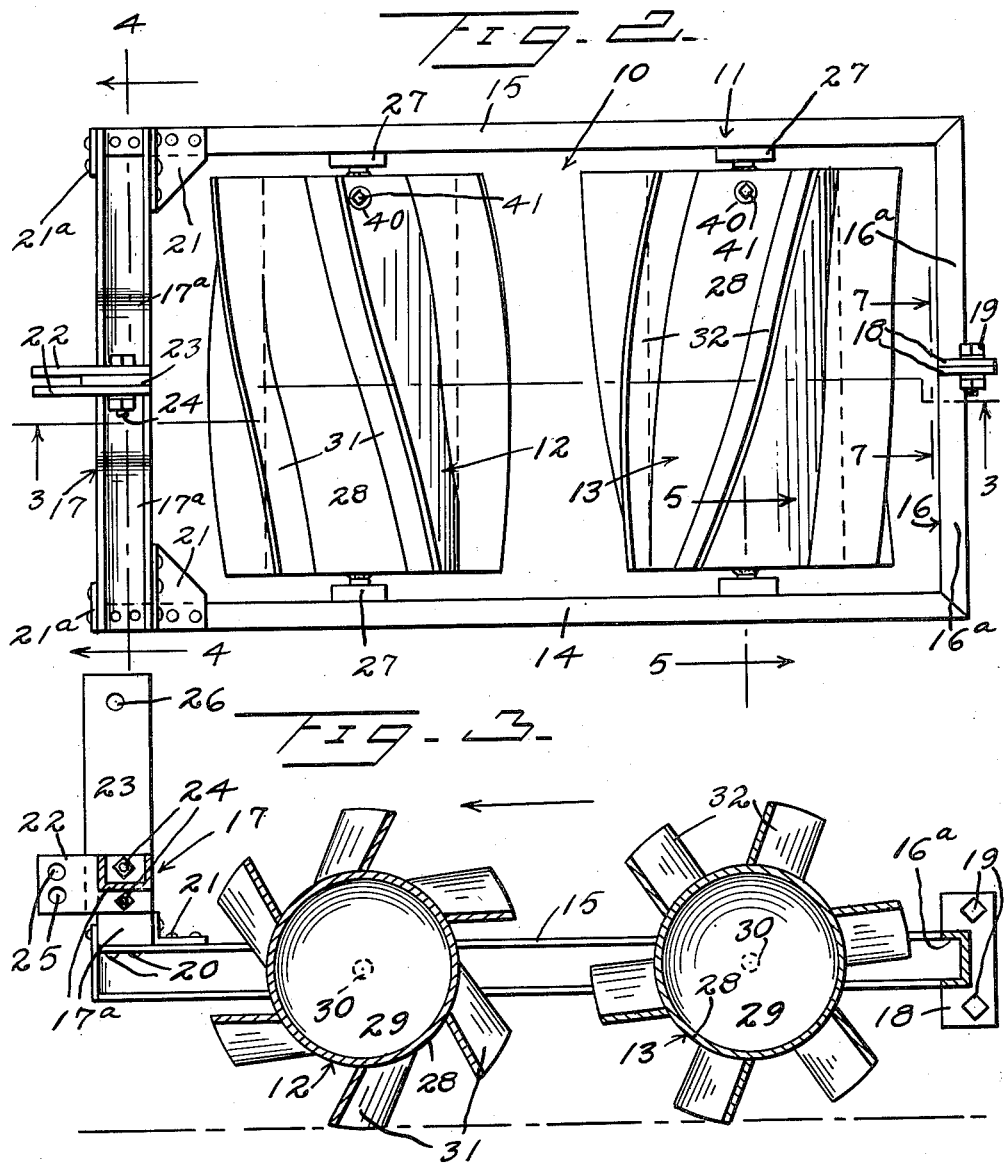

United States Patent Office 2,791,955
Patented May 14, 1957

2,791,955
CULTIVATOR
Zacariah J. Wilson, Brooksville, Fla.
Application June 6, 1955, Serial No. 513,205
1 Claim. (Cl. 97—52)

This invention relates to a novel cultivator of extremely simple construction which is primarily adapted for farm, garden and groove use and which constitutes a trailer type implement adapted to be drawn behind a tractor or any other suitable draft vehicle.

More particularly, it is an aim of the present invention to provide a combination cultivator which will effectively function as a weed chopper, a pulverizer, and for cultivating the earth similar to a double disk harrow.

A further object of the invention is to provide a cultivator having novel means for effecting a change in leverage through its draft connection for adapting it to function either as a chopper or as a cultivator or pulverizer.

Various other objects and advantages of the invention will hereinafter become more fully apparent from the following description of the drawings, illustrating a presently preferred embodiment thereof, and wherein:

Figure 1 is a side elevational view of the cultivator;

Figure 2 is a top plan view thereof;

Figure 3 is a longitudinal sectional view of the cultivator, taken substantially along a plane as indicated by the line 3—3 of Figure 2;

Figure 4 is a cross sectional view through the forward end of the cultivator, taken substantially along a plane as indicated by the line 4—4 of Figure 2;

Figure 5 is a fragmentary transverse sectional view on a somewhat enlarged scale, taken substantially along a plane as indicated by the line 5—5 of Figure 2;

Figure 6 is a fragmentary horizontal sectional view, taken substantially along a plane as indicated by the line 6—6 of Figure 5, and Figure 7 is a fragmentary sectional view, taken substantially along a plane as indicated by the line 7—7 of Figure 2 and on a somewhat enlarged scale.

Referring more specifically to the drawings, the cultivator in its entirety and comprising the invention is designated generally 10 and includes a substantially rectangular frame, designated generally 11, in which is journaled a front drum member 12 and a rear drum member 13.

The frame 11 includes spaced substantially parallel sides 14 and 15 of inwardly opening channel shape cross section, a rear frame portion 16 and a front frame portion 17. The rear frame portion 16 is likewise of inwardly opening channel shape cross section and includes corresponding end sections 16a to the adjacent ends of which are secured substantially upright plates 18. The plates 18 are normally disposed in abutting engagement and are secured together by nut and bolt fastenings 19. The front frame portion 17 is arched, as best seen in Figure 4 and includes end sections 17a, preferably of upwardly opening channel shape cross section. The remote ends of the sections 17a have bottom portions resting on the upper flanges of the forward ends of the sides 14 and 15 and are secured thereto by fastenings 20. The sections 17a may be further secured to the forward ends of the sides 14 and 15 by angle braces 21 and front flat braces 21a, as seen in Figures 1 to 3, which are secured to said sides and to the front sections 17a. The adjacent ends of the sections 17a have plates 22 secured thereto and which are disposed substantially parallel to one another. The lower end of a rigid upright member 23 is disposed between portions of the plates 22 and is secured thereto by detachable fastenings 24 which extend therethrough and through said plates for connecting the front frame sections 17a. Said plates 22 have forwardly extending portions which project forwardly from the front frame member 17 and from the upright 23 and which are provided with vertically spaced registering apertures 25, as seen in Figure 3. The upright 23 is provided adjacent its upper end with an opening 26. From the foregoing it will be readily apparent that the frame 11 can be separated into two substantially corresponding longitudinal halves by removal of the fastenings 19 and 24.

Two longitudinally spaced bearing members 27 are suitably secured in the channel of each frame side 14 and 15. The drum members 12 and 13 each includes a cylindrical outer or peripheral wall 28 and end walls 29 which are fixed in the ends of the wall 28. The end walls 29 have axially aligned stub shafts 30 fixed to and projecting outwardly therefrom and which are journaled in the bearings 27. The stub shafts 30 of the front cylinder 12 are journaled in the front bearings 27 of the frame sides 14 and 15 and the stub shafts of the rear cylinder 13 are journaled in the other two rear bearings 27 of the sides 14 and 15, whereby the drums are disposed in longitudinally spaced relation to one another.

The front drum 12 has a plurality of fixed blades 31 each of which extends from end-to-end of the cylindrical wall 28 thereof. The blades 31 are substantially uniformly pitched in the same direction. Additionally, as best seen in Figures 1 and 3, each blade 31 is disposed at an incline in a clockwise direction from the inner longitudinal edge thereof, which is secured to the cylindrical wall 28 to the outer longitudinal edge thereof. The inclination of the blades 31 is preferably such as to form an angle of approximately 30° with a radius of the drum 12.

The rear drum 13 is likewise provided with a plurality of blades 32, each of which extends from end-to-end of the outer wall 28 of the drum 13, and which have inner longitudinal edges secured in any suitable manner to the outer surface of the drum 13. The blades 32 preferably correspond in number to the blades 31 and are preferably spaced apart the same distance circumferentially as said blades 31. However, the blades 32 are pitched in the opposite direction to the blades 31, as best illustrated in Figures 2 and 3. Additionally, the blades 32 are inclined outwardly from their inner longitudinal edges to their outer longitudinal edges in the same direction as the blades 31 but preferably to a greater extent so that the plane of the blades 32, for example, are disposed to form an angle of 20° with a radius of the drum 13.

A draft bar 33 has a hook 34 at one end thereof for engaging an eye 35 of a coupling member 36 which may be attached to any suitable draft vehicle, not shown, such as a tractor. The draft bar 33 has a hook 37 at its opposite end adapted to engage a clevis 38. The clevis 38 may be detachably secured to the upright 23 by nut and a bolt fastening 39 which extends through the opening 26 thereof. When thus disposed, as seen in full lines in Figure 1, a forward pull on the draft bar 33 from right to left will exert a leverage force on the frame 11 tending to rock the forward end of the frame downwardly and to exert a lifting force on the rear end of the frame. Consequently, the blades 31 of the front drum 12 will penetrate the earth to a greater extent than the blades 32 of the rear drum 13 when the clevis 38 is connected to the upright 23. The cultivator 10 is supported solely by engagement of the blades 31 and 32 with the ground or earth and the extent of penetration of the blades into the earth will vary depending upon the hardness of the earth and the extent that the cultivator is weighted, as will hereinafter be described. Accordingly, when the clevis 38 is attached to the upright 23 to cause the blades 31 to penetrate to a greater extent than the blades 32, the cultivator can be effectively utilized for chopping weeds.

For otherwise cultivating the earth, the clevis 38 is attached to either the upper or lower opening 25 of the plates 22, as illustrated in dotted lines in Figure 1, so that the draft pull through the bar 33 will be upwardly and forwardly from right to left so that the blades of the two drums will more equally sustain the weight of the cultivator. When the cultivator is thus utilized, it will operate similar to a disk harrow for cultivating the earth leaving a crisscross pattern made by the blades 31 and 32 cutting into the earth. It will be readily apparent that this crisscross pattern produced by the blades 31 and 32 will effectively pulverize the soil. It will also be understood that the drums 12 and 13 are revolved by contact of the blades 31 and 32 with the earth and as the cultivator is drawn from right to left, as seen in Figures 1 and 3, it will be noted that the inner edges of the blades 31 and 32, which are secured to the drum peripheries 28, constitute the leading edges of said blades whereas the outer earth engaging longitudinal edges constitute the trailing edges of the blades due to the fact that both drums revolve counterclockwise, as viewed in Figures 1 and 3.

Each drum periphery 28 is provided with a filling opening 40, as seen in Figure 2, which is normally closed by a plug and through which openings the drums 12 and 13 may be filled or partially filled with water for weighting the cultivator to any desired extent. The drums may thus be weighted to different extents, if desired, for varying the extent of penetration of the blades 31 and 32, depending upon the type of operation to be performed by the cultivator.

It will be obvious that the cultivator may be made in various sizes and that the relative length and width thereof, as illustrated in the drawings can be varied substantially.

Various other modifications and changes are likewise contemplated and may obviously be resorted to, without departing from the function or scope of the invention as hereinafter defined by the appended claim.

I claim as my invention:

A trailer type earth working machine comprising a frame having spaced substantially parallel sides, said frame including a front portion extending transversely between and secured to complementary forward ends of the frame sides, a pair of drums disposed in said frame in spaced apart relation to one another and having their axes disposed crosswise of the frame, means journaling said drums in the frame sides, each of said drums being provided with a plurality of earth engaging blades projecting outwardly from the periphery thereof and each extending longitudinally of the drum, said blades being disposed in circumferentially spaced relation to one another and each including an inner edge fixed to the drum periphery and an outer free edge, said blades of each drum being pitched in the same direction, and draft means including a draft bar connected to an intermediate part of said front frame portion and extending forwardly therefrom and having a forward end adapted to be connected to a draft coupling member whereby a forward pull is adapted to be exerted on the frame through said draft means, portions of said drums and the blades thereof extending downwardly from the frame whereby portions of the blades are adapted to engage and penetrate the earth for supporting the machine and an upright fixed to and rising from the intermediate part of said front frame portion and to the upper part of which said draft means is selectively attachable for exerting a downward and forward leverage force on the frame for causing the frame to rock about the axis of the forward drum to elevate the rear portion of the frame and the rear drum to force the blades of the forward drum downwardly for penetration of the earth to a greater extent than the blades of the rear drum.

References Cited in the file of this patent

UNITED STATES PATENTS

| | | |
|---|---|---|
| 985,641 | Stier | Feb. 28, 1911 |
| 1,213,998 | Backlund | Jan. 30, 1917 |
| 1,248,706 | Porteous | Dec. 4, 1917 |
| 2,234,534 | Reno | Mar. 11, 1941 |
| 2,553,356 | Cady | May 15, 1951 |
| 2,574,468 | Denton | Nov. 13, 1951 |
| 2,654,982 | Edwards | Oct. 13, 1953 |